US011334532B2

(12) United States Patent
Beier et al.

(10) Patent No.: US 11,334,532 B2
(45) Date of Patent: May 17, 2022

(54) DYNAMIC SELECTION OF DATA APPLY STRATEGY DURING DATABASE REPLICATION

(71) Applicant: International Business Machines Corporation, Armonk, NY (US)

(72) Inventors: Felix Beier, Haigerloch (DE); Dennis Butterstein, Stuttgart (DE); Einar Lueck, Filderstadt (DE); Sabine Perathoner-Tschaffler, Nufringen (DE); Daniel Martin, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/815,415

(22) Filed: Mar. 11, 2020

(65) Prior Publication Data

US 2021/0286775 A1    Sep. 16, 2021

(51) Int. Cl.
| | | |
|---|---|---|
| *G06F 16/182* | (2019.01) | |
| *G06F 16/17* | (2019.01) | |
| *G06F 16/27* | (2019.01) | |
| *G06F 16/18* | (2019.01) | |
| *G06F 16/22* | (2019.01) | |

(Continued)

(52) U.S. Cl.
CPC ...... *G06F 16/1844* (2019.01); *G06F 16/1734* (2019.01); *G06F 16/1827* (2019.01); *G06F 16/1865* (2019.01); *G06F 16/221* (2019.01); *G06F 16/2282* (2019.01);
(Continued)

(58) Field of Classification Search
CPC ............. G06F 16/1844; G06F 16/1827; G06F 16/1865; G06F 16/221; G06F 16/24534; G06F 16/254; G06F 16/2282; G06F 16/1734; G06F 16/273
See application file for complete search history.

(56) References Cited

U.S. PATENT DOCUMENTS

| | | | |
|---|---|---|---|
| 7,529,759 B2 * | 5/2009 | Chen ................ | G06F 16/24565 |
| 7,853,561 B2 | 12/2010 | Holenstein et al. | |

(Continued)

OTHER PUBLICATIONS

"DSI Bulk Copy-in", Sybase Infocenter, http://infocenter.sybase.com/help/index.jsp?topic=/com.sybase.infocenter.dc32518.1571/doc/html/san1292613388360.html. Created May 23, 2012, 1 page.

(Continued)

*Primary Examiner* — David T. Brooks
*Assistant Examiner* — Lana Alagic
(74) *Attorney, Agent, or Firm* — William H. Hartwell; Madeline F. Schiesser; Keohane & D'Alessandro, PLLC

(57) ABSTRACT

Approaches presented herein enable replicating data records between a source database and a target database. More specifically, for a batch of change records in a table received from the source database, a first estimated replication duration needed to apply the batch as a bulk change to the target is determined. For the same batch, a second estimated replication duration needed to apply a set of changes in a single row of the table to the target is determined based on time penalties for each column in the row. A threshold quantity of rows at which the first duration equals a summed total of second durations for the quantity is calculated. The bulk change is selected if a number of rows in the batch exceeds the threshold. Applying change records singly is selected if the number of rows in the batch is less than the threshold.

15 Claims, 5 Drawing Sheets

(51) Int. Cl.
*G06F 16/2453* (2019.01)
*G06F 16/25* (2019.01)

(52) U.S. Cl.
CPC ...... *G06F 16/24534* (2019.01); *G06F 16/254* (2019.01); *G06F 16/273* (2019.01)

(56) References Cited

U.S. PATENT DOCUMENTS

| | | |
|---|---|---|
| 8,121,978 B2 | 2/2012 | Wiss et al. |
| 10,114,582 B1* | 10/2018 | Rao ..................... G06F 11/3485 |
| 2015/0347470 A1* | 12/2015 | Ma ....................... G06F 16/2372 |
| | | 707/803 |
| 2016/0179892 A1* | 6/2016 | Gregory ............... G06F 16/252 |
| | | 707/720 |
| 2017/0147672 A1* | 5/2017 | Arnold .................... G06F 16/27 |
| 2018/0137187 A1 | 5/2018 | Brodt et al. |

OTHER PUBLICATIONS

"Global_max_batch_size", https://www.ibm.com/support/knowledgecenter/en/sstrgz_10.2.1/com.ibm.cdcdoc.mcadminguide.doc/refs/global_max_batch_size_DB2LUW.html, Copyright 2013, 3 pages.

"Acceptable_latency_in_minutes", IBM InfoSphere Change Data Capture, Version 10.2.1, https://www.ibm.com/support/knowledgecenter/en/SSTRGZ_10.2.1/com.ibm.cdcdoc.mcadminguide.doc/refs/acceptable_latency_in_minutes.html, 2013, 1 pg.

* cited by examiner

TABLE A

| I1 INTEGER NOT NULL | C1 VARCHAR(20) | R1 FLOAT |
|---|---|---|
| ... | ... | ... |
| ... | ... | ... |
| ... | ... | ... |
| ... | ... | ... |
| ... | ... | ... |
| ... | ... | ... |

FIG. 4

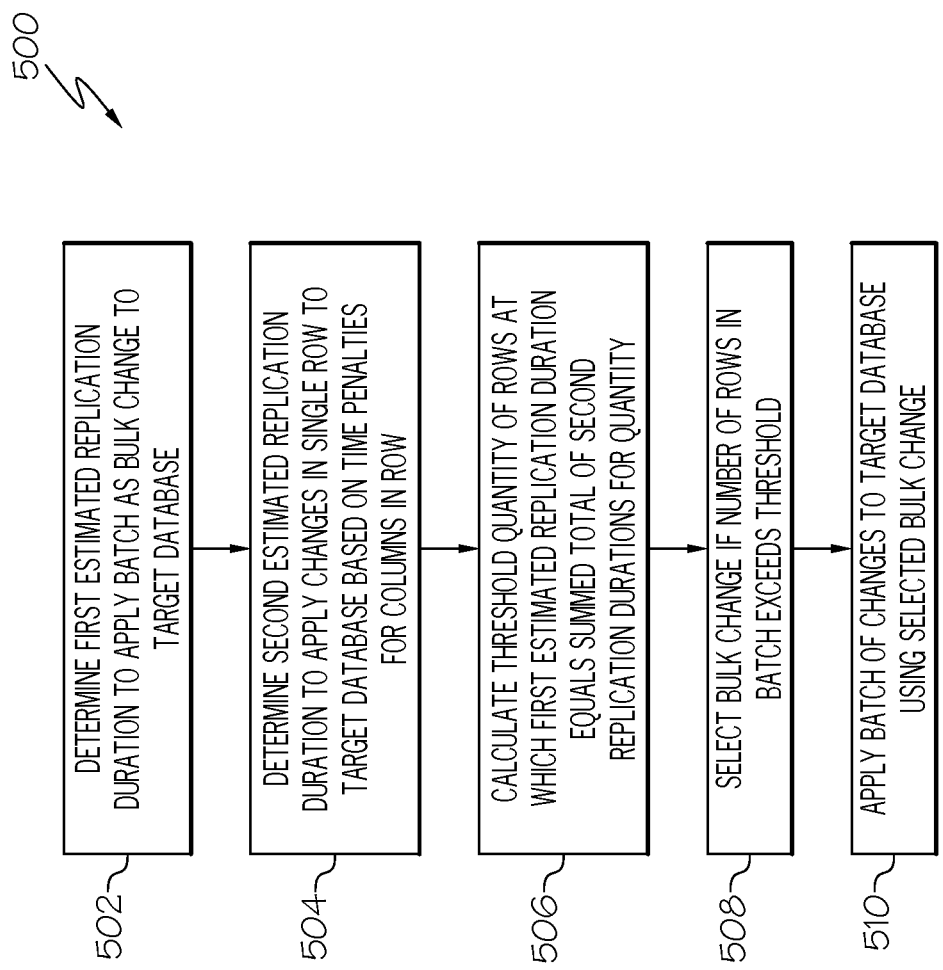

DYNAMIC SELECTION OF DATA APPLY STRATEGY DURING DATABASE REPLICATION

TECHNICAL FIELD

The present invention relates generally to data replication and, more specifically, to dynamic selection of a data apply strategy for replication of data to a target database.

BACKGROUND

Replication of a state of a primary database to one or more secondary databases can be used, among other things, to create a recovery record in the case of failure of the primary database. Generally, a primary database is continuously changed by operations, such as insert, update, and delete. Records of these operations can be gathered and applied to the recovery database using dynamic or batch replication. While dynamic replication allows each individual transaction to be immediately mirrored to a secondary database, this form of replication is resource intensive and generally only performed in situations where the data needs to be completely up to date in the secondary site. Less resource intensive is batch replication, in which change operations are not mirrored instantly. Rather, in batch replication, records can be gathered until a threshold is reached, such as a certain period of time and/or a particular quantity of data, before the gathered change operations are applied to the recovery database. This results in the recovery database having latency relative to the primary database. The greater the latency of the recovery database, the more out of date that database is relative to the primary database and the less useful the recovery database is in the case that data recovery is necessitated.

SUMMARY

Approaches presented herein enable replicating data records between a source database and a target database. More specifically, for a batch of change records in a table received from the source database, a first estimated replication duration needed to apply the batch as a bulk change to the target is determined. For the same batch, a second estimated replication duration needed to apply a set of changes in a single row of the table to the target is determined based on time penalties for each column in the row. A threshold quantity of rows at which the first duration equals a summed total of second durations for the quantity is calculated. The bulk change is selected if a number of rows in the batch exceeds the threshold. Applying change records singly is selected if the number of rows in the batch is less than the threshold.

One aspect of the present invention includes a method for replicating data records between a source database system and a target database system, comprising: determining, for a batch of change records received from the source database system in a table, a first estimated replication duration needed to apply the batch of change records as a bulk change to the target database system; determining, for the batch of change records received from the source database system in the table, a second estimated replication duration needed to apply a set of changes in a single row of the table to the target database system based on time penalties for each column in the row; calculating a threshold quantity of rows at which the first estimated replication duration equals a summed total of second replication durations for the quantity of rows; selecting the bulk change in the case that a number of rows in the batch exceeds the threshold; and applying, responsive to the selecting, the batch of changes to the target database system using the selected bulk change.

Another aspect of the present invention includes a computer system for replicating data records between a source database system and a target database system, the computer system comprising: a memory medium comprising program instructions; a bus coupled to the memory medium; and a processor, for executing the program instructions, coupled to an apply manager via the bus that when executing the program instructions causes the computer system to: determine, for a batch of change records received from the source database system in a table, a first estimated replication duration needed to apply the batch of change records as a bulk change to the target database system; determine, for the batch of change records received from the source database system in the table, a second estimated replication duration needed to apply a set of changes in a single row of the table to the target database system based on time penalties for each column in the row; calculate a threshold quantity of rows at which the first estimated replication duration equals a summed total of second replication durations for the quantity of rows; select the bulk change in the case that a number of rows in the batch exceeds the threshold; and apply, responsive to the selection, the batch of changes to the target database system using the selected bulk change.

Yet another aspect of the present invention includes a computer program product for replicating data records between a source database system and a target database system, the computer program product comprising at least one computer readable hardware storage device, and program instructions collectively stored on the at least one computer readable hardware storage device, to: determine, for a batch of change records received from the source database system in a table, a first estimated replication duration needed to apply the batch of change records as a bulk change to the target database system; determine, for the batch of change records received from the source database system in the table, a second estimated replication duration needed to apply a set of changes in a single row of the table to the target database system based on time penalties for each column in the row; calculate a threshold quantity of rows at which the first estimated replication duration equals a summed total of second replication durations for the quantity of rows; select the bulk change in the case that a number of rows in the batch exceeds the threshold; and apply, responsive to the selection, the batch of changes to the target database system using the selected bulk change.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIG. 4 shows a batch of changes in a table according to illustrative embodiments.

FIG. 5 shows a process flowchart for replicating data records between a source database system and a target database system according to illustrative embodiments.

Figure 1:
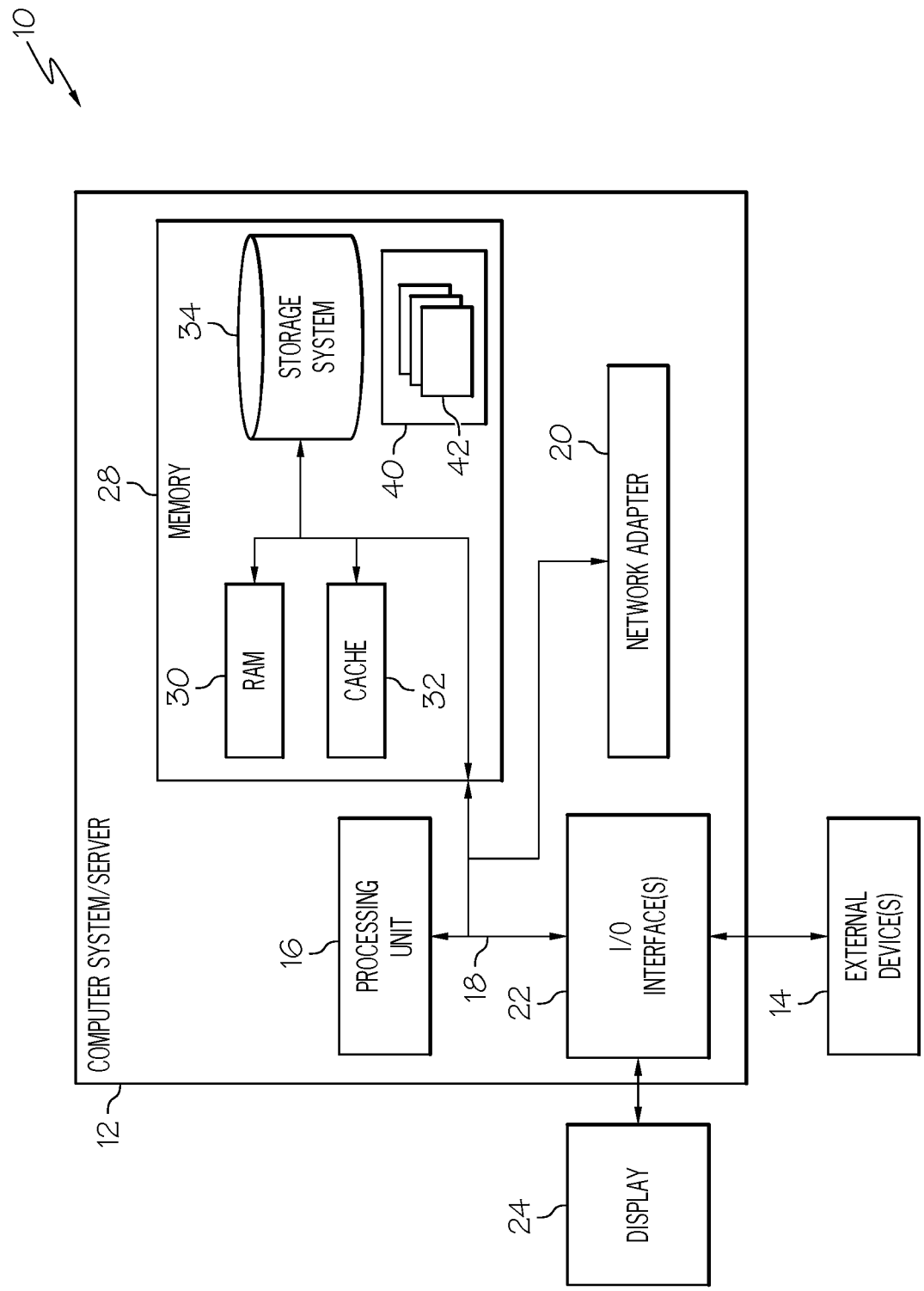
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for replicating data records between a source database and a target database. More specifically, for a batch of change records in a table received from the source database, a first estimated replication duration needed to apply the batch as a bulk change to the target is determined. For the same batch, a second estimated replication duration needed to apply a set of changes in a single row of the table to the target is determined based on time penalties for each column in the row. A threshold quantity of rows at which the first duration equals a summed total of second durations for the quantity is calculated. The bulk change is selected if a number of rows in the batch exceeds the threshold. Applying change records singly is selected if the number of rows in the batch is less than the threshold.

Referring now to FIG. 1, a computerized implementation 10 of an embodiment for replicating data records between a source database system and a target database system will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for replicating data records between a source database system and a target database system. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for replicating data records between a source database system and a target database system, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found several deficiencies in current database replication techniques. Current database replication products that use these deficient techniques generally operate on an incremental database change replication system that can have several components, including a source database system having a recovery log, a log reader, an apply component having a log buffer, and a target database system. These components are described in further detail below A source database system provides a data source for the replication product. The state of this database may be continuously changing with new insert, update, and delete operations. These modifying operations can be recorded in both the database and a recovery log. The primary purpose of the recovery log is to back up database state transitions, thereby allowing a restoration of the exact database state by replaying the operations in the log records.

A log reader component may be external to the source database system and can read log records from the recovery logs of the source database systems. The log reader can extract relevant modification information from these logs, including insertions, updates, and deletions of target tables during replication. Such extracted information can be transmitted to an apply component.

At an apply component, log records sent from the log reader are buffered and consolidated into batches of changes. This consolidation can be used in some replication products to improve efficiency when applying modifications to a target database via a bulk-load tool.

The destination for data fetched from the source database system by the replication product is a target database system. In some replication products, the target database system can provide a set of apply paths optimized for different scenarios (e.g., bulk-loading, trickle feeds, etc.). The two most commonly used apply paths are single record apply (also known as trickle apply) path and bulk apply path, as will be described in further detail below.

Conventional replication products seek to use the more efficient path when selecting between single record and bulk apply paths. The selected modification path may be based on considerations such as compensation and avoiding transaction overhead. As such, in conventional replication products, the basis used to select a modification path fail to take into consideration performance characteristics of a particular batch of data when making such a selection. As such, the inventors of the present invention seek to cure this deficiency in the present art by describing herein techniques to select the best apply implementation that minimizes overheads and optimizes important metrics, such as replication latencies, throughputs, etc.

Accordingly, the inventors of the present invention have developed a system that, according to embodiments, selects between use of a single record apply path and a bulk apply path based on characteristics of the particular batch of data to be applied.

In the single record apply path, each change record is applied individually (e.g., via a structured query language (SQL) statement). This strategy is generally used for small data sets, as the overhead for large chunks is very high, but for smaller sets is less than the overhead for a bulk apply. This is because, when individually applied using SQL statements, a statement must be generated for each record and each statement must be parsed by a management system of the target database system.

By comparison, in a bulk apply, change records are staged into batches, which are then applied via a bulk load interface to the target database system. This strategy is generally used for large data sets, as the overhead to set up the bulk load is too high for small-sized chunks that are comprised of just a few rows, but becomes increasingly efficient the more rows in the batch.

To select between use of a single record apply path and a bulk apply path in embodiments of the present invention, a set of metrics is computed for each batch. A set of statically configured parameters are used to determine for the given metrics of the batch by which implementation the batch is to be applied to a target database system. In some embodiments, these statically configured parameters are part of the registration of a batch apply implementation.

Embodiments of the present invention offer several advantages for replication of data records between a source database system and a target database system. More specifically, for example, by measuring actual parameters for each apply implementation, each implementation can be optimized for certain non-functional (i.e., performance) characteristics.

Figure 2:
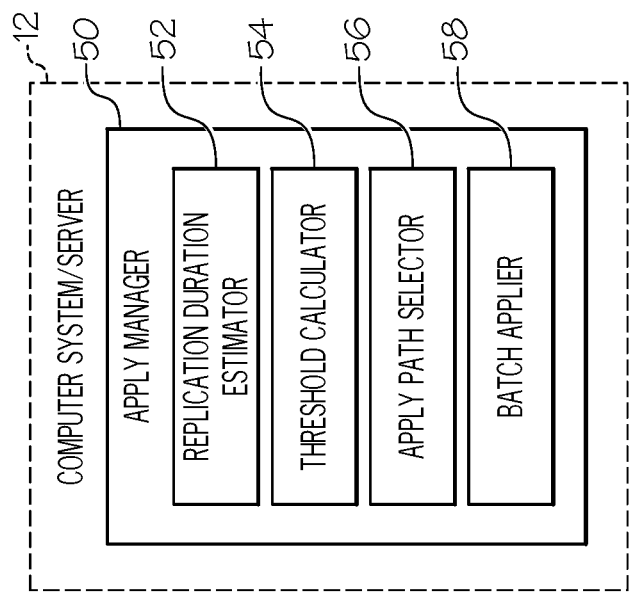
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have an apply manager 50. Rather, all or part of apply manager 50 could be loaded on a server or server-capable device that communicates (e.g., wirelessly) with the clients to provide for replication of data records between a source database system and a target database system. Regardless, as depicted, apply manager 50 is shown within computer system/server 12. In general, apply manager 50 can be implemented as program/utility 40 on computer system 12 of FIG. 1 and can enable the functions recited herein.

Along these lines, apply manager 50 may perform multiple functions. Specifically, among other functions, apply manager 50 can replicate data records between a source database system and a target database system in a networked computing environment. To accomplish this, apply manager 50 can include a set of components (e.g., program modules 42 of FIG. 1) for carrying out embodiments of the present invention. These components can include, but are not limited to, replication duration estimator 52, threshold calculator 54, apply path selector 56, and batch applier 58.

Figure 3:
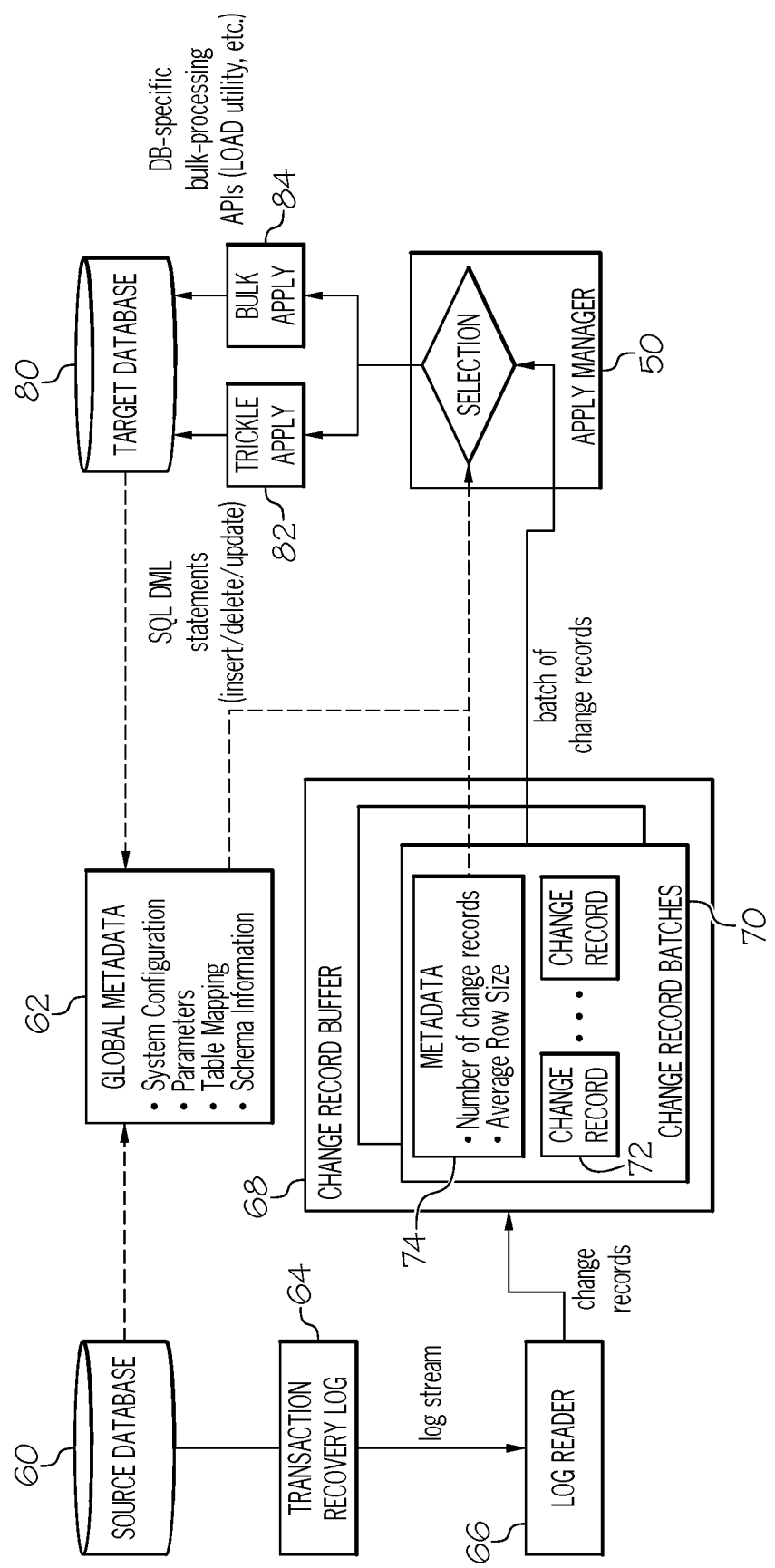
FIG. 3 shows a wider system diagram describing the functionality discussed herein according to illustrative embodiments.

Referring now to FIG. 3, a wider system diagram describing the functionality discussed herein is shown according to illustrative embodiments. Some embodiments of the present invention can be performed in an environment containing a source database system 60, a transaction recovery log 64, a log reader 66, a change record buffer 68, and a target database system 80, in addition to apply manager 50 of embodiments of the present invention.

Source database system 60 can be any database system/server that provides a data source for replication to a target database system 80. The state of this database may be continuously changing with new insert, update, and/or delete operations. Source database system 60 can contain global metadata 62 describing the data stored therein, such as connections between database systems 60 and 80 and, more specifically, the tables therein. This global metadata 62 may include, for example, information on the system configuration of source database system 60, parameters, table mappings, and schema information. In some embodiments, table mappings can include, but are not limited to, table names in both systems, locations for reading log records, and data types of table schema (i.e., a set of columns which are required for parsing, at least a subset of which can be replicated from a table on source database system 60 into a corresponding table in target database system 80 according to embodiments of the present invention). Similarly, target database system 80 can be any database system/server that stores a backup copy of data from source database system 60.

In some embodiments, the modifying operations are made to database system 60 and recorded in transaction recovery log 64. In some embodiments, transaction recovery log 64 may be a component of source database system 60, but alternatively may be separate therefrom. In some embodiments, transaction recovery log 64 can store the modifying operations as a table of recorded changes to the source database.

Log reader 66 can extract change records encoding data changes from transaction recovery log 64 by reading transaction recovery logs of the table of recorded changes from transaction recovery log 64. In some embodiments, log reader 66 can obtain these records as a stream from transaction recovery log 64. According to some embodiments, log reader 66 can extract relevant modification information from the logs, including insertions, updates, and deletions intended for target tables during replication.

Change record buffer 68 can buffer the extracted change records 72 and group the extracted change records 72 into batches (or chunks or blocks) 70 of change records, before flushing the buffered changes using a flush strategy. In some embodiments, change records 72 can each have a transaction ID. Change record buffer 68 can combine sets of change records 72, grouped by transaction ID, into a table, having a table ID, for each batch 70 in some embodiments. A batch 70 can have metadata 74 describing the table of the batch. This batch metadata can include, but is not limited to, a number of change records in the batch table and an average row size of the batch table.

Change record buffer 68 can seal a batch 70 of change records 72 in response to a condition being met. Once batch 70 is sealed, it is ready to be applied to target database system 80, as will be described in more detail below with reference to apply manager 50. According to some embodiments, the condition triggering sealing can include, but is not limited to, a threshold size of the batch being reached, a threshold period of time being reached, or the first occurrence of either of those events. In the case that the condition is size based, change records buffer 68 continues collecting changes 72 in a batch 70 until a certain amount of data (e.g., 50 MB) is reached. In the case that the condition is time based, change records buffer 68 continues collecting changes 72 in a batch 70 until a specified amount of latency (e.g., 1 minute) has accumulated, or a specific time period has passed. In some embodiments, once any of these conditions has been met, batch 70 is sealed.

Latency, as used herein, defines how out of date target database system 80 is. For example, if target database system 80 looks like source database system 60 did 47 seconds ago, then the latency of target database system 80 is 47 seconds. In some embodiments, latency on target database system 80 can be calculated as:

$$L = T_{target} - T_{commit}$$

where L is the latency, $T_{target}$ is the current time of target database system 80, and $T_{commit}$ is the last commit group time of the last applied change records batch 70 to target database system 80 from source database system 60. As such, the greater the latency, the more out of date a target system is from the source system, resulting in a greater loss of uncommitted data in the event of a failure of the source system.

Returning now to change records buffer 68, in previous data replication systems, once a condition for sealing a batch is met, the collected changes are generally applied on a target database using a same modification path for any batch table having a number of rows in an upper (bulk apply) or lower (trickle apply) range, regardless of the unique data type content contained in that batch table and regardless of whether such is actually optimal for the batch. Consequently, data characteristics of that sealed batch, such as the number of changes to a single table, width and datatypes of the table, and the overhead imposed by the modification path, are not taken into account. Accordingly, apply manager 50 of embodiments of the present invention, as will be discussed below, cures these deficiencies.

Referring back now to FIG. 2, in connection with FIG. 3, replication duration estimator 52, as performed by computer system/server 12, determines, for a batch of change records 70 in a table received from a source database system 60, a first estimated replication duration needed to apply the batch of change records 72 as a bulk change to a target database system 80. To accomplish this, replication duration estimator 52 determines a length of time it will take to set up and execute a bulk change. This length of time can be determined in any manner now known or later discovered in the art. For instance, in some embodiments, replication duration estimator 52 can use a state-of-the art regression analysis to analyze historical transaction logs from target database system 80 to find how long setting up a bulk change took in the past on that particular system. In some embodiments, the determined bulk change setup time can include the time needed to also execute the bulk change. In some other embodiments, replication duration estimator 52 can take calibration measurements of target database 80 to determine the length of time associated with the bulk change.

Figure 4:
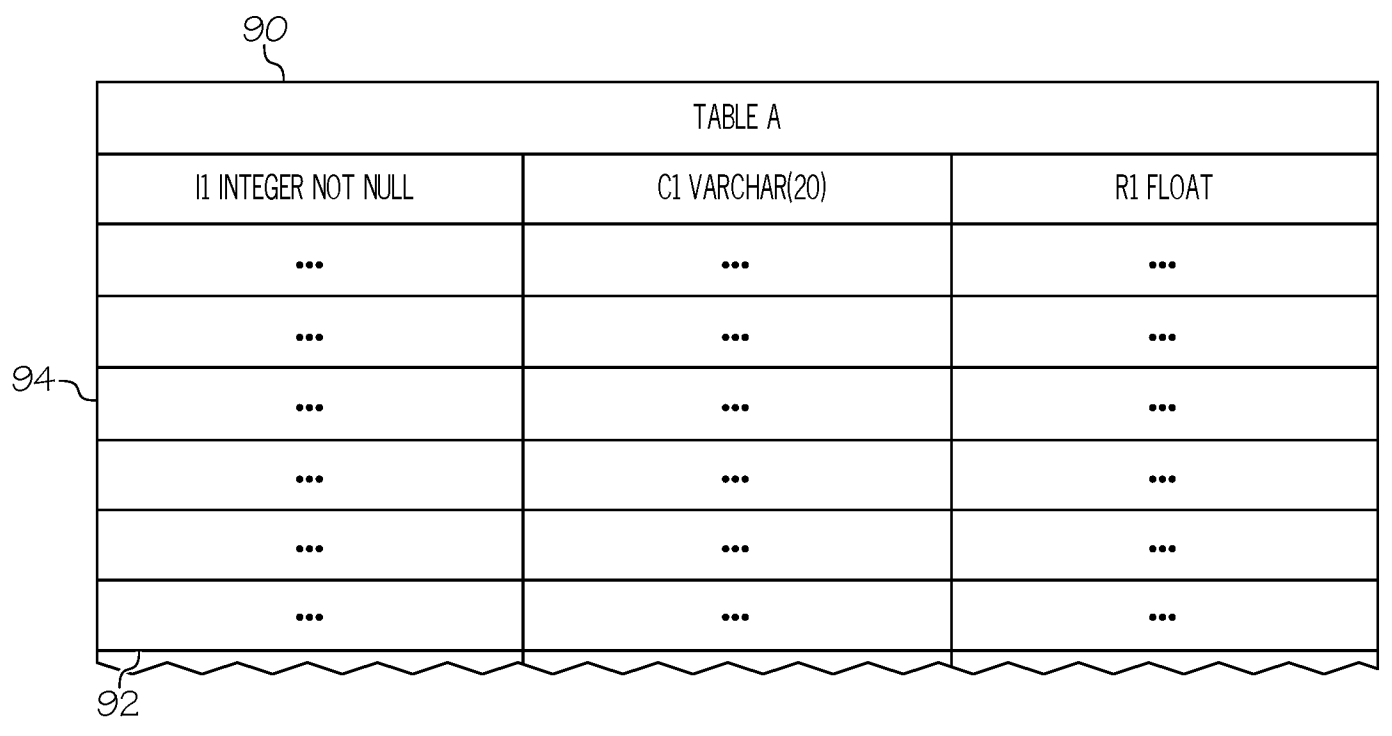

Referring now to FIG. 4 in addition to FIG. 2 and FIG. 3, an illustrative example will be discussed here and below using an example table 90, having table ID "A," shown in FIG. 4. Example table 90 is an example of a table in a batch 70 containing sealed change records 72 and having associated metadata 74. In this illustrative example, it may be assumed that replication duration estimator 52 has determined (e.g., based on historical records of the particular target database system 800) that setup ($S_B$) for a bulk apply in the particular target database system 80 takes 800 microseconds, hence:

$$S_B = 800 \text{ ms}$$

Referring back now to FIG. 2, in connection with FIG. 3, replication duration estimator 52, as performed by computer system/server 12, determines, for the batch of change records 70 in the table received from the source database system 60, a second estimated replication duration needed to apply a set of changes in a single row of the table to the target database system 80 based on time penalties for each column in the row. In some embodiments, replication duration estimator 52 can previously have calculated a time penalty for various data types (e.g., integer, short, long, float, double, character, string, boolean). To accomplish this, replication duration estimator 52 can create tables containing only a single data type and then execute measured queries on these tables to yield a set of times needed to apply changes to a particular target database system 80 using a trickle apply method. The yielded times can be averaged and normalized per row to calculate an average time needed to apply a particular data type to the particular target database system 80 singly. In this manner, replication duration estimator 52 can evaluate table schema information of batch 70 as a cost model for each column type of the batch table. This can include combining multiple columns of different types because a single table can have more than one column of a particular type in that table. For example, a table might have two columns, both containing integers, in which case the time penalty for integers would be counted twice.

In some embodiments, time penalties can be adjusted automatically or as needed. For example, time penalties can be recalculated periodically to account for changes or differences in target database system 80. Such changes can be caused by, for example, a database version of target database system 80 as versions may have various modification speeds, hardware of target database system 80 as disk speed may vary, and network bandwidth.

In any case, once replication duration estimator 52 has calculated a time penalty for each data type, replication duration estimator 52 can associate that time penalty with a column of the data table in change record batch 70 containing data of that type. Replication duration estimator 52 can calculate a total time penalty for a single row of the data table in change record batch 70 by summing the associated time penalties across the row.

This process will be better illustrated with reference to the illustrative example begun above with respect to FIG. 4. In this example, table 90 has three columns 92, each containing data of a different type: integers that are not null (I1) in the first column, variable character fields having lengths up to 20 characters (C1) in the second column, and floats (R1) in the third column. In this example, table 90 also has a number of rows 94, each corresponding to a change record 72. Replication duration estimator 52 can calculate an average single insertion time penalty for each of the data types presented in example table 90. In this example, replication duration estimator 52 assigns to integer I1 an insertion time penalty ($P_i$) of 0.1 ms (assumption based on integer I1 having a fixed length), assigns to varchar C1 an insertion time penalty ($P_v$) of 0.01 ms per character (assumption based on varchar C1 having a variable length that requires a calculation per character), and assigns to float R1 an insertion time penalty ($P_f$) of 0.7 ms (assumption based on float R1 being of fixed length but expensive), such that:

$$P_i = 0.1 \text{ ms}$$

$$P_v(x) = (0.01 \text{ ms})^*x$$

$$P_f = 0.7 \text{ ms}$$

From these insertion time penalties, replication duration estimator 52 can determine a total insertion time penalty ($P_R$) for a single row 94 of table 90 by adding together the penalty for each column:

$$P_R = +P_v(x) + P_f$$

In this example, the total insertion time penalty for a single row 94 of table 90 is calculated as follows:

$$P_R = P_i + P_v(20) + P_f$$

$$P_R = 0.1 + 0.01^*20 + 0.7$$

$$P_R = 1.0 \text{ ms/row}$$

As such, for example table 90 shown in FIG. 4, the insertion time penalty for a single row 94 is 1.0 ms.

Referring back now to FIG. 2, in connection with FIG. 3, threshold calculator 54, as performed by computer system/server 12, calculates a threshold quantity of rows at which the first estimated replication duration equals a summed total of second replication durations for the quantity of rows. By contrast, conventional replication systems use pre-configured, static threshold ($R_S$) for the upper limit of modified rows that can supposedly efficiently be inserted into a target database system table using trickle/single apply. This static threshold may be defined based on the replication system itself, using, for example, calibration measurements with the target database system. Hence, if the number of modified rows per table exceeds the threshold $R_S$, the table is inserted into the target database system using a bulk apply/change. And if the number of modified rows per table is less than or equal to the threshold $R_S$, the table is inserted into the target database system using a trickle/single apply/change. However, this static threshold $R_S$ is based on the replication system itself, and fails to take into consideration table characteristics, causing suboptimal settings for at least some tables when these conventional replication systems are used.

Embodiments of the present invention permit threshold calculator 54 to calculate a table-specific threshold ($R_T$) for the upper limit of modified rows that can efficiently be inserted into a target database system 80 table based on the above described modeling of data types. As such, the calculated threshold $R_T$ is specific to the characteristics of a particular table (or to a set of tables having the same column characteristics). Therefore, unlike in conventional replication systems where a row threshold is a generic parameter for a target system and suboptimal to some tables, table-specific threshold $R_T$ can be made optimal to each new table to be applied to target database system 80. According to some embodiments of the present invention, table-specific threshold $R_T$ can be calculated by finding the number of rows at which the cumulative time to input each row singly (assuming the determined single row time penalty is the same for each row) is equal to the determined setup time for a bulk application of the table.

Again, this process will be better illustrated with reference to the illustrative example begun above with respect to FIG. 4. In this example, replication duration estimator 52 determined that the estimated bulk setup time for example table 90 is 800 ms and that the total insertion time penalty for a single row 94 of table 90 is 1.0 ms/row. As such, threshold calculator 54 can calculate the threshold number of rows in table 90, above which using a bulk change to apply table 90 to target database system 90 becomes more efficient than applying changes singly to a single row in target database system 90, as follows:

$$R_T = S_B/P_R$$

$$R_T = 800 \text{ ms}/1.0 \text{ ms/row}$$

$$R_T = 800 \text{ rows}$$

In some embodiments, threshold calculator 54 can calculate the table-specific threshold $R_T$ as described above. In some additional embodiments, apply manager 50 can store the calculated table-specific threshold $R_T$ along with metadata describing the schema (i.e., data types of each column) of the table to which the threshold corresponds. In the case that apply manager 50 receives other subsequent tables having the same column schema (regardless of number of rows), apply manager need not have replication duration estimator 52 again determine an insertion time penalty for a single row of the subsequent table having the same column schema nor have threshold calculator 54 again calculate the threshold number of rows above which using a bulk change to apply the subsequent table to target database system 90 becomes more efficient than applying changes singly to a single row in target database system 90. Instead, apply manager 50 can retrieve the calculated table-specific threshold $R_T$ from storage by searching for a previously calculated, stored threshold having associated metadata matching the column schema. In the case that such a previously calculated, stored threshold is found, apply manager 50 can jump ahead to selecting between trickle and bulk apply, as described further below.

In some other embodiments, threshold calculator 54 can, instead of finding table-specific threshold $R_T$, calculate a total table insertion time penalty for a table by multiplying the total insertion time penalty for a single row determined by replication duration estimator 52 by the number of actual rows in the table. In this alternative embodiment, threshold calculator 54 can then treat the estimated bulk setup time determined by replication duration estimator 52 as a threshold and determine whether the resultant total table insertion time penalty is greater than or less than the estimated bulk setup time. The former indicates that a bulk change should be used, while the latter indicates use of single row changes.

Referring back now to FIG. 2, in connection with FIG. 3, apply path selector 56, as performed by computer system/server 12, selects bulk change 84 in the case that a number of rows in batch 70 exceeds the threshold. Alternatively, apply path selector 56 selects applying change records singly 82 in the case that the number of rows in batch 70 is less than the threshold. To accomplish this, apply path selector 56 can determine a number of rows in the data table of change record batch 70. In some embodiments, apply path selector 56 can obtain a number of change record rows in the data table of change record batch 70 from metadata 74 attached to batch 70. In still other embodiments, apply path selector 56 can count a number of rows in the data table of change record batch 70. In any case, having obtained the number of rows ($N_R$) in the data table of change record batch 70, apply path selector 56 can compare the number of rows $N_R$ to the table-specific threshold $R_T$. In the case that the number of rows in the table exceeds the threshold ($N_R > R_T$), then apply path selector 56 selects to apply change record batch 70 to target database 80 using bulk apply 84. By contrast, in the case that the number of rows in the table is less than the threshold ($N_R < R_T$), then apply path selector 56 selects to apply change record batch 70 to target database 80 using trickle apply 82, applying each change record 72 separately. In some embodiments, in the case that the number of rows in the table is equal to the threshold ($N_R = R_T$), then apply path selector 56 can be configured to select either trickle apply 82 or bulk apply 84. In some embodiments, when the time cost to perform a bulk or trickle apply is equal, other considerations, such as optimizing compensation or avoiding transaction overhead, may be used to decide with apply method will be used.

Once again, this process will be better illustrated with reference to the illustrative example discussed above with respect to FIG. 4. Continuing this example, threshold calculator 54 has determined that:

$$R_T = 800 \text{ rows}$$

Accordingly, if the number of rows 94 of example table 90 obtained by apply path selector 56 is greater than 800 rows, for example $$N_R = 1200 \text{ rows},$$

then apply path selector 56 selects to apply the modifications of table 90 to target database 80 using bulk apply 84. On the other hand, if the number of rows 94 of example table 90 obtained by apply path selector 56 is less than or equal to 800 rows, for example $$N_R = 400 \text{ rows},$$

then apply path selector 56 selects to apply the modifications of table 90 to target database 80 singly using trickle apply 82.

Referring back now to FIG. 2, in connection with FIG. 3, batch applier 58, as performed by computer system/server 12, applies batch of changes 70 to target database system 80 using the selected change. In the case that apply path selector 56 determines that a bulk change 84 should be used to apply batch 70 to target database system 80, batch applier 58 can apply batch 70 to target database system 80 via a bulk change apply pathway 84. In some embodiments, to use bulk change apply pathway 84, batch applier 58 can transform change records 72 of batch 70 into a format that is used as input for native bulk-loading utilities provided by target database system 80. For example, batch applier 58 can use bulk-processing APIs (e.g., a LOAD utility) specific to target database system 80 to perform the bulk change.

In the alternative case that apply path selector 56 determines that single changes 82 should be used to apply batch 70 to target database system 80, batch applier 58 can apply batch 70 to target database system 80 via a trickle change apply pathway 82. In some embodiments, to use trickle change apply pathway 82, batch applier 58 can generate and execute a Structured Query Language (SQL) statement (e.g., in Data Manipulation Language (DML)) to apply the change (e.g., insert, delete, update) for each change record 72 of batch 70 to target database system 80. Embodiments of the present invention can also be applied to databases other than relational databases that use SQL language. For example, in some embodiments, batch applier 58 can apply changes to databases, such as object stores, graphs, etc., using an appropriate trickle apply technique for those databases.

The activities performed by replication duration estimator 52, threshold calculator 54, apply path selector 56, and batch applier 58 can be repeated for other tables in upcoming batches.

For example, replication duration estimator 52 can determine, for a second batch of change records in a second table received from source database system 60, a third estimated replication duration needed to apply the second batch of change records as a bulk change 84 to target database system 80. Replication duration estimator 52 can further determine, for the second batch of change records in the second table received from the source database system 60, a fourth estimated replication duration needed to apply a set of changes in a single row of the second table to target database system 80 based on time penalties for each column in the row of the second table. Threshold calculator 54 can then calculate a second threshold quantity of rows of the second table at which the third estimated replication duration equals a summed total of fourth replication durations for the quantity of rows. Apply path selector 56 will then select bulk change 84 in the case that a number of rows in the second batch exceeds the second threshold or, alternatively, will select applying change records singly 82 in the case that the number of rows in the second batch is less than the second threshold. Batch applier 58 can then apply the second batch of changes to the target database system 80 using the newly selected change.

Accordingly, it should be understood that a first threshold ($R_{TA}$) can be calculated for a first table (Table A) and a different, second threshold ($R_{TB}$) can be calculated for a second table (Table B). As such, even if Table A and Table B have the same number of rows/records ($N_{RA}$ and $N_{RB}$, respectively), it is possible that apply manager 50 will select a different apply strategy for each because they have different threshold number of rows at which a bulk change becomes more efficient than a trickle change. For example, if $N_{RA} = 1000$ rows, $N_{RB} = 1000$ rows, $R_{TA} = 900$ rows, and $R_{TB} = 1100$ rows, then apply manager 50 will apply the changes of Table A as a bulk change 84 because $N_{RA} > R_{TA}$, and apply the changes of Table B singly 82 because $N_{RB} < R_{TB}$.

It should be appreciated that, while embodiments of the present invention have primarily been discussed with reference to trickle and bulk apply pathways, some other embodiments of the invention may be implemented in data replication environments that use other apply pathways presently known or later discovered. In such environments in which other apply pathways are used, the teachings of embodiments of the present invention can be used to find a table-specific threshold, as described above, between a first apply pathway that is generally more efficient for smaller data sets and a second apply pathway that is generally more efficient for larger data sets.

As depicted in FIG. 5, in one embodiment, a system (e.g., computer system/server 12) carries out the methodologies disclosed herein. Shown is a process flowchart 500 for replicating data records between a source database system and a target database system. At 502, replication duration estimator 52 determines, for a batch 70 of change records 72 in a table received from the source database system 60, a first estimated replication duration needed to apply the batch 70 of change records 72 as a bulk change 84 to the target database system 80. At 504, replication duration estimator 52 determines, for the batch 70 of change records 72 in the table received from the source database system 60, a second estimated replication duration needed to apply a set of changes in a single row of the table to the target database system 80 based on time penalties for each column in the row. At 506, threshold calculator 54 calculates a threshold quantity of rows at which the first estimated replication duration equals a summed total of second replication durations for the quantity of rows. At 508, apply path selector 56 selects the bulk change 84 in the case that a number of rows in the batch 70 exceeds the threshold. At 510, batch applier 58 applies the batch 70 of changes to the target database system 80 using the selected bulk change.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for replicating data records between a source database system and a target database system. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for replicating data records between a source database system and a target database system. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to replicate data records between a source database system and a target database system. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for replicating data records between a source database system and a target database system, comprising:
extracting a batch of change records encoding data changes from the source database system by reading transaction recovery logs of the source database system;
buffering the extracted change records in a change record buffer and grouping the extracted change records into the batch of change records;
flushing the buffered change records from the buffer using a flush strategy, the flush strategy comprising at least one strategy selected from the group consisting of: flush in response to a filled buffer, flush periodically, and flush based on latency of the target database system;

determining, for the batch of change records, said batch being obtained in a table, a first estimated replication duration needed to apply the batch of change records as a bulk change to the target database system;

determining, for the batch of change records obtained in the table, a second estimated replication duration needed to apply a set of changes in a single row of the table to the target database system based on time penalties for each column in the row, the determining the second estimated replication duration comprising:

evaluating table schema information of the batch as a cost model for each column type of the table;

determining a time penalty for each column type of the table; and summing the time penalties for each column type to yield the second estimated replication duration;

calculating a threshold quantity of rows at which the first estimated replication duration equals a summed total of second replication durations for the quantity of rows;

selecting the bulk change in the case that a number of rows in the batch exceeds the threshold; and applying, responsive to the selecting, the batch of changes to the target database system using the selected bulk change.

2. The method of claim 1, the method further comprising:
selecting applying change records singly in the case that the number of rows in the batch is less than the threshold; and applying, responsive to the single application selection, the batch of changes to the target database system singly.

3. The method of claim 2, wherein the bulk change transforms change records into a format that is used as input for native bulk-loading utilities provided by the target database system, and wherein applying the change records singly executes a Structured Query Language (SQL) statement to apply the change for each change record.

4. The method of claim 1, the change record buffer being associated with a table of the source database.

5. The method of claim 1, the method further comprising:
calibrating the cost models by creating sample tables with a predefined set of columns of the types to be calibrated;

executing sample insertions and deletions on said sample tables; and measuring and averaging execution costs of the samples.

6. A computer system for replicating data records between a source database system and a target database system, the computer system comprising:

a memory medium comprising program instructions;
a bus coupled to the memory medium; and
a processor, for executing the program instructions, coupled to an apply manager via the bus that when executing the program instructions causes the computer system to:

extract a batch of change records encoding data changes from the source database system by reading transaction recovery logs of the source database system;

buffer the extracted change records in a change record buffer and grouping the extracted change records into the batch of change records;

flush the buffered change records from the buffer using a flush strategy, the flush strategy comprising at least one strategy selected from the group consisting of:

flush in response to a filled buffer, flush periodically, and flush based on latency of the target database system;

determine, for the batch of change records, said batch being obtained in a table, a first estimated replication duration needed to apply the batch of change records as a bulk change to the target database system;

determine, for the batch of change records obtained in the table, a second estimated replication duration needed to apply a set of changes in a single row of the table to the target database system based on time penalties for each column in the row the program instructions to cause the computer system to determine the second estimated replication duration further causing the computer system to:

evaluate table schema information of the batch as a cost model for each column type of the table;

determine a time penalty for each column type of the table; and sum the time penalties for each column type to yield the second estimated replication duration;

calculate a threshold quantity of rows at which the first estimated replication duration equals a summed total of second replication durations for the quantity of rows;

select the bulk change in the case that a number of rows in the batch exceeds the threshold; and apply, responsive to the selection, the batch of changes to the target database system using the selected bulk change.

7. The computer system of claim 6, the instructions further causing the computer system to:

select applying change records singly in the case that the number of rows in the batch is less than the threshold; and apply, responsive to the single application selection, the batch of changes to the target database system singly.

8. The computer system of claim 7, wherein the bulk change transforms change records into a format that is used as input for native bulk-loading utilities provided by the target database system, and wherein applying the change records singly executes a Structured Query Language (SQL) statement to apply the change for each change record.

9. The computer system of claim 6, the change record buffer being associated with a table of the source database.

10. The computer system of claim 6, the instructions further causing the system to:

calibrate the cost models by creating sample tables with a predefined set of columns of the types to be calibrated;

execute sample insertions and deletions on said sample tables; and measure and average execution costs of the samples.

11. A computer program product for replicating data records between a source database system and a target database system, the computer program product comprising at least one computer readable hardware storage device, and program instructions collectively stored on the at least one computer readable hardware storage device, to:

extract a batch of change records encoding data changes from the source database system by reading transaction recovery logs of the source database system;

buffer the extracted change records in a change record buffer and grouping the extracted change records into the batch of change records;

flush the buffered change records from the buffer using a flush strategy, the flush strategy comprising at least one strategy selected from the group consisting of: flush in response to a filled buffer, flush periodically, and flush based on latency of the target database system;

determine, for the batch of change records, said batch being obtained in a table, a first estimated replication duration needed to apply the batch of change records as a bulk change to the target database system;

determine, for the batch of change records obtained in the table, a second estimated replication duration needed to apply a set of changes in a single row of the table to the target database system based on time penalties for each column in the row the program instructions to determine the second estimated replication duration also to:
  evaluate table schema information of the batch as a cost model for each column type of the table;
  determine a time penalty for each column type of the table; and
  sum the time penalties for each column type to yield the second estimated replication duration;

calculate a threshold quantity of rows at which the first estimated replication duration equals a summed total of second replication durations for the quantity of rows;

select the bulk change in the case that a number of rows in the batch exceeds the threshold; and apply, responsive to the selection, the batch of changes to the target database system using the selected bulk change.

12. The computer program product of claim 11, the at least one computer readable storage device further collectively comprising instructions to:
  select applying change records singly in the case that the number of rows in the batch is less than the threshold; and
  apply, responsive to the single application selection, the batch of changes to the target database system singly.

13. The computer program product of claim 12, wherein the bulk change transforms change records into a format that is used as input for native bulk-loading utilities provided by the target database system, and wherein applying the change records singly executes a Structured Query Language (SQL) statement to apply the change for each change record.

14. The computer program product of claim 11, the change record buffer being associated with a table of the source database.

15. The computer program product of claim 11, the instructions to determine the second estimated replication duration needed to apply a set of changes in a single row further comprising instructions to:
  calibrate the cost models by creating sample tables with a predefined set of columns of the types to be calibrated;
  execute sample insertions and deletions on said sample tables; and
  measure and average execution costs of the samples.

* * * * *